T. J. THORP.
MOTOR VEHICLE.
APPLICATION FILED MAY 22, 1907. RENEWED FEB. 26, 1910.
965,607.
Patented July 26, 1910.
4 SHEETS—SHEET 3.
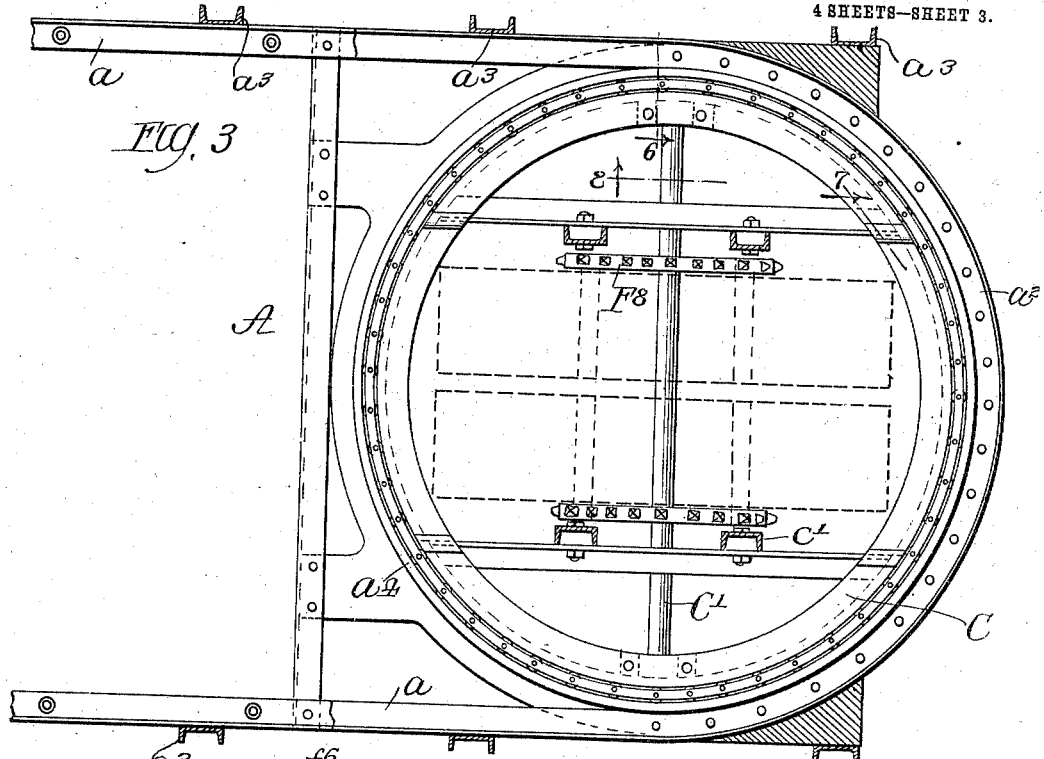
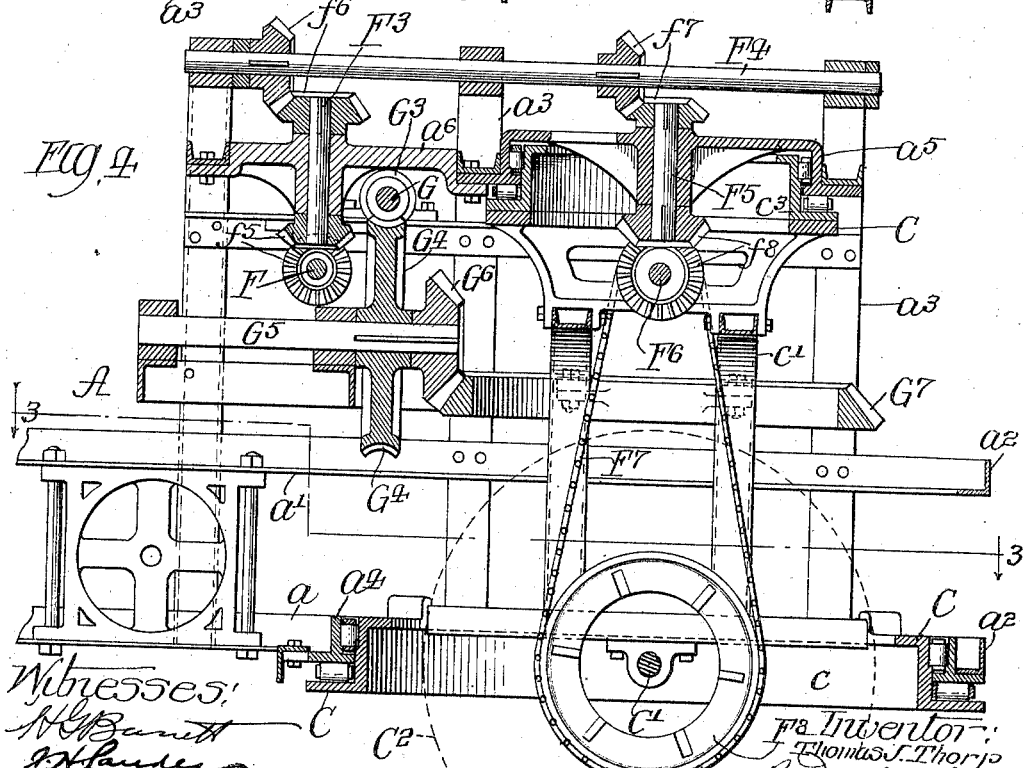
Witnesses:
Inventor:
Thomas J. Thorp T. J. THORP.
MOTOR VEHICLE.
APPLICATION FILED MAY 22, 1907. RENEWED FEB. 26, 1910.
965,607.
Patented July 26, 1910.
4 SHEETS—SHEET 4.
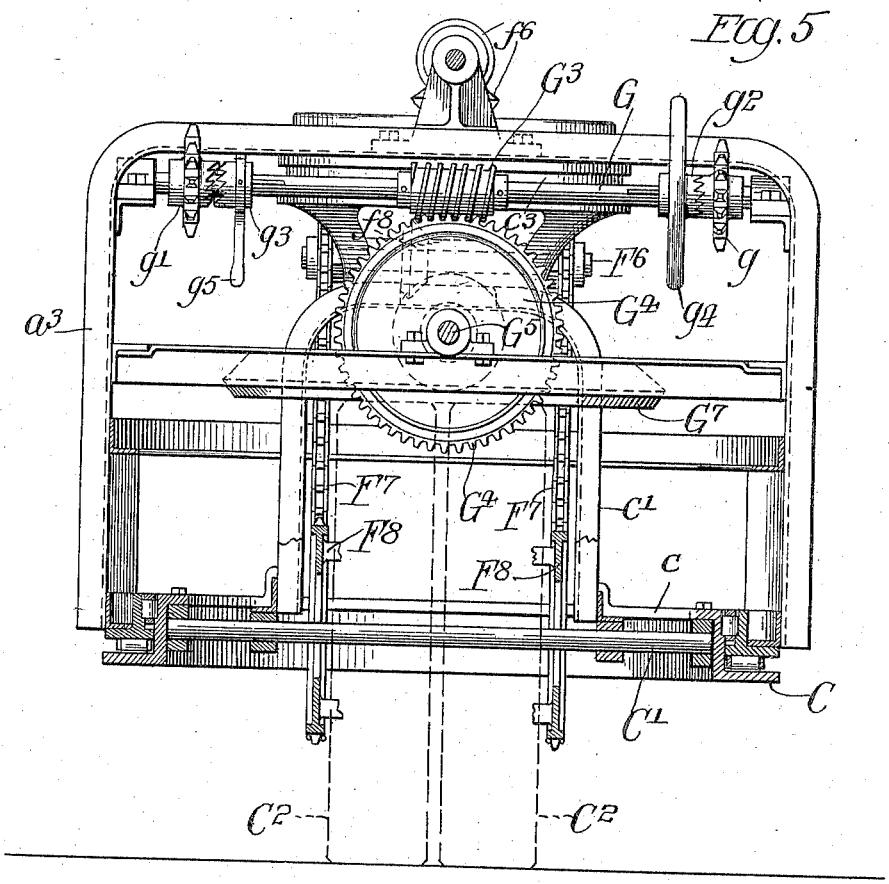
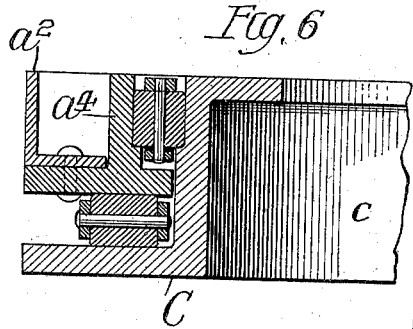
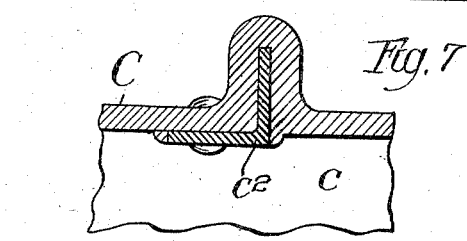
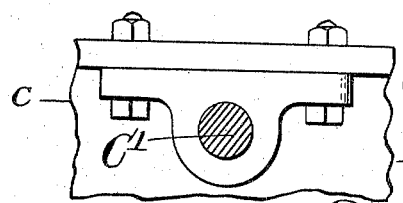
Witnesses:
Inventor:
Thomas J. Thorp

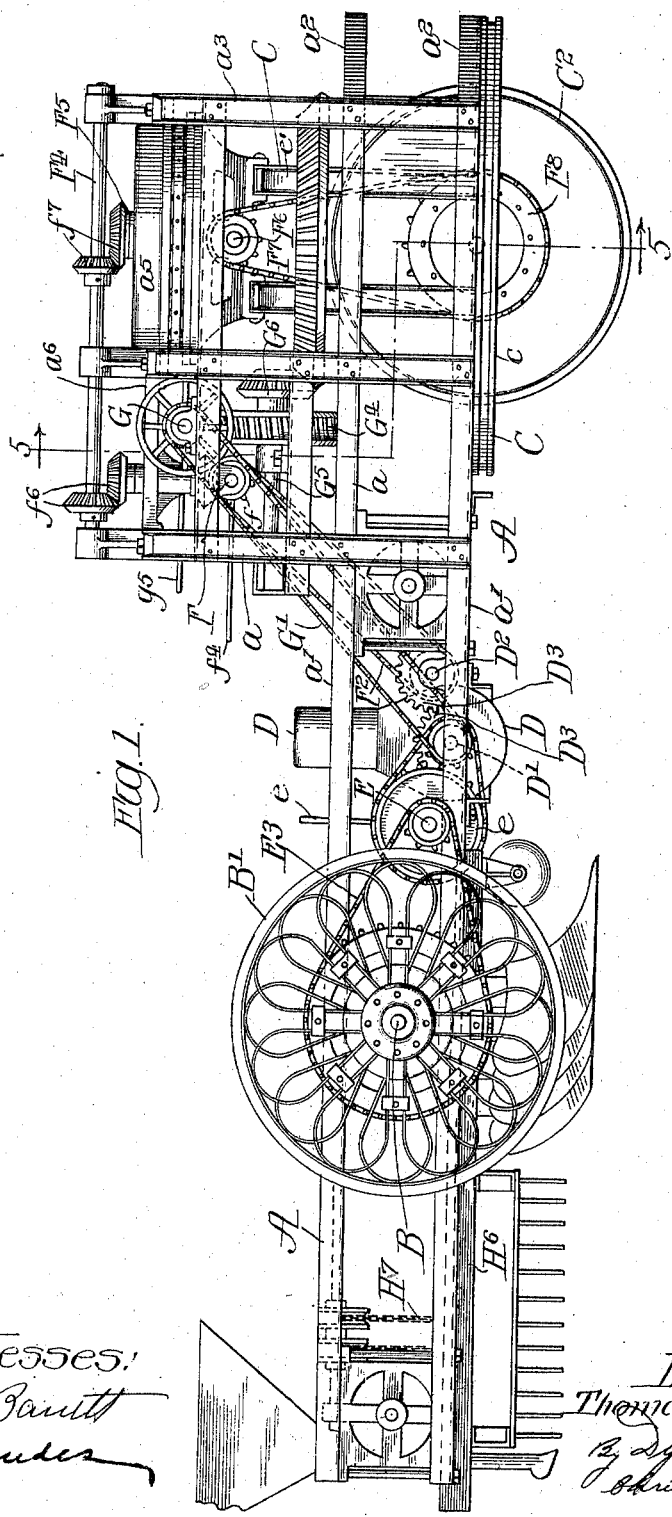

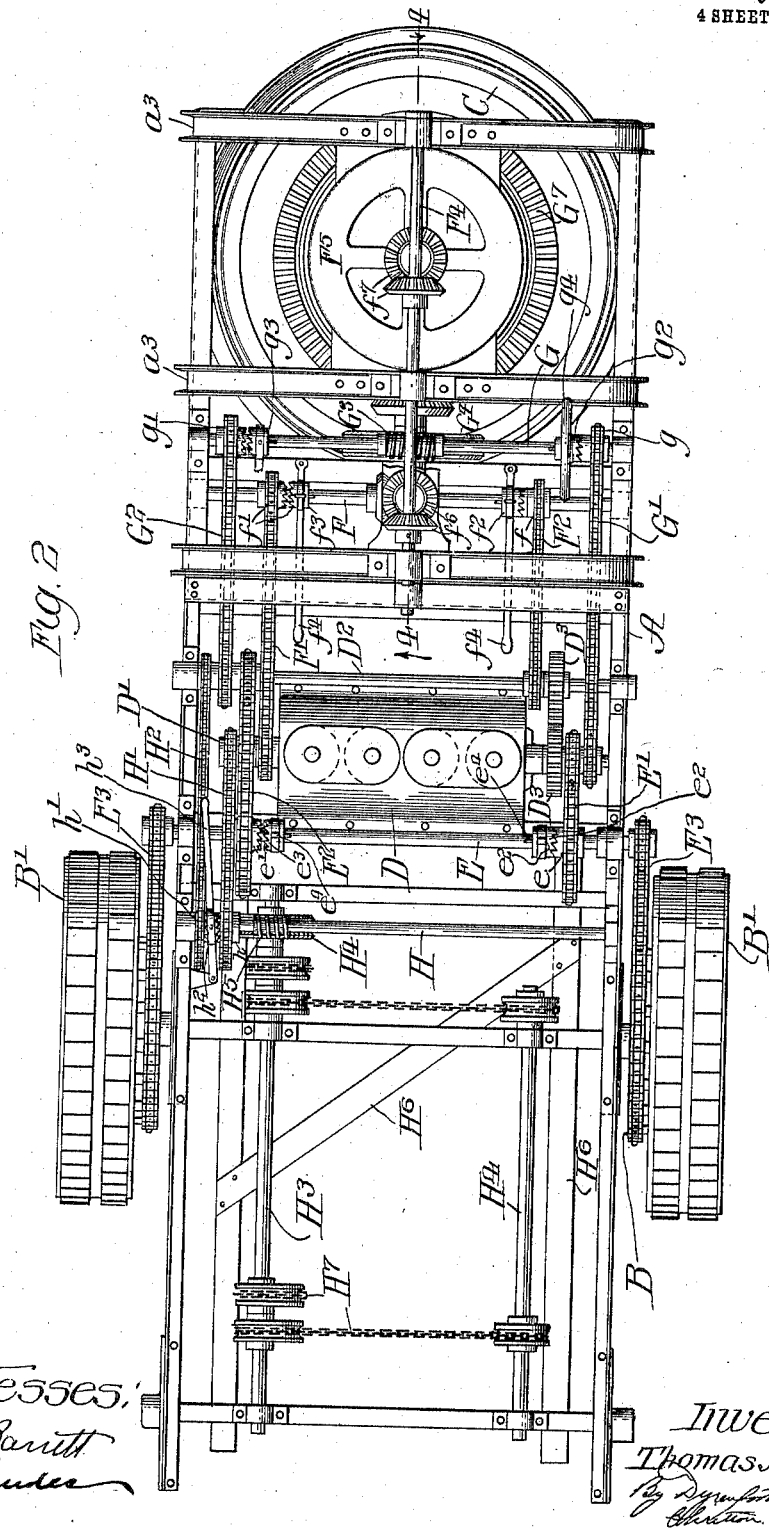

UNITED STATES PATENT OFFICE.

THOMAS J. THORP, OF CORVALLIS, OREGON, ASSIGNOR TO T. J. THORP MANUFACTURING COMPANY, OF CORVALLIS, OREGON, A CORPORATION OF OREGON.

MOTOR-VEHICLE.

965,607. Specification of Letters Patent. Patented July 26, 1910.

Application filed May 22, 1907, Serial No. 375,013. Renewed February 26, 1910. Serial No. 546,261.

*To all whom it may concern:*

Be it known that I, THOMAS J. THORP, a citizen of the United States, residing at Corvallis, in the county of Benton and State of Oregon, have invented a new and useful Improvement in Motor-Vehicles, of which the following is a specification.

My invention relates particularly to self-propelled vehicles adapted either to truck purposes or to agricultural machine purposes; and my primary object is to provide a motor vehicle of the character indicated of improved general construction, having provision for steering the machine by power and having provision also for employing the front wheels as well as the rear wheels of the vehicle for traction purposes.

The preferred embodiment of the broad invention herein illustrated is shown in the accompanying drawings, in which:

Figure 1 represents a side elevational view of my invention, showing the same equipped with an auxiliary tool-frame carrying plows, harrow and seeder, said tool-frame and the parts carried thereby forming no part of the present invention, however; Fig. 2, a plan view of the same, not showing the plows, harrow and seeder; Fig. 3, a broken plan section taken as indicated at line 3 of Fig. 4, and illustrating the manner in which the front portion of the main frame of the machine is supported on the front wheel-frame; Fig. 4, a broken vertical longitudinal section taken as indicated at line 4 of Fig. 2 and illustrating details of the mechanism for transmitting power to the front wheels of the machine, and of the mechanism for steering the machine; Fig. 5, a vertical transverse section taken as indicated at line 5 of Fig. 1; Fig. 6, an enlarged broken section taken as indicated at line 6 of Fig. 3 and showing a detail of the manner in which the front end of the main frame is supported on the front wheel-frame; Fig. 7, an enlarged broken section taken as indicated at line 7 of Fig. 3 and showing a detail of the manner in which a bar forming a part of the front wheel-frame is connected with a circle forming a part of the front wheel-frame; and Fig. 8, an enlarged broken section taken as indicated at line 8 of Fig. 3 and showing one of the connections between the front wheel-frame and the shaft upon which the front wheels are journaled.

In the construction illustrated, A represents the main frame of the machine; B, the rear axle supported on wheels $B^1$; C, a turn-table or front wheel-frame supported on an axle $C^1$ upon which are journaled front wheels $C^2$; D, a motor supported on the main frame and provided with a shaft $D^1$; $D^2$, a counter-shaft which is continuously operated from the engine-shaft by gears $D^3$; E, a shaft connected by a sprocket chain $E^1$ to the engine-shaft and by a sprocket chain $E^2$ to the counter-shaft $D^2$; $E^3$, sprocket chains connecting the shaft E to the rear wheels $B^1$; F, a shaft journaled in the main frame connected by a sprocket chain $F^1$ to the engine shaft and by a sprocket chain $F^2$ to the counter-shaft $D^2$; $F^3$, a vertically-disposed shaft geared to the shaft F and to a longitudinally-disposed shaft $F^4$ supported by the main frame; $F^5$, a vertically-disposed shaft coaxial with the turn-table or front wheel-frame C and geared to the horizontal shaft $F^4$; $F^6$, a transverse shaft journaled in the turn-table or front wheel-frame and joined by sprocket chains $F^7$ to sprocket wheels $F^8$ which are firmly secured to the front wheels $C^2$; G, a transverse shaft joined by a sprocket chain $G^1$ to the engine-shaft and by a sprocket chain $G^2$ to the counter-shaft $D^2$ and equipped with a worm $G^3$ meshing with a worm-wheel $G^4$ on a longitudinally-disposed horizontal shaft $G^5$ journaled in the main frame; $G^6$, a bevel gear on the front end of the shaft $G^5$ meshing with a bevel gear $G^7$ firmly secured to the turn-table or front wheel-frame C; H, a worm-shaft connected by a sprocket chain $H^1$ to the engine-shaft and by a sprocket chain $H^2$ to the counter-shaft $D^2$; $H^3$, a longitudinally-disposed shaft equipped with a worm-wheel $H^4$ meshing with a worm $H^5$ on the shaft H; and $H^6$, an auxiliary tool-frame suspended by chains $H^7$ from the shaft $H^3$ and a parallel shaft $H^4$ connected therewith.

The main frame A may be of any suitable construction. As shown, it comprises upper and lower members $a$, $a^1$, each of which is formed by bending an angle-bar intermediately to form a half circle $a^2$, the projecting members forming side members of the main frame; a standard $a^3$ rising from the front portions of the members $a$, $a^1$, a lower circle $a^4$ firmly secured to the front portion of the lower member $a$; an upper circle $a^5$ rigidly connected with the upper portion of the standard $a^3$ and affording a bearing for the vertically-disposed power-shaft $F^5$; and a frame-member $a^6$ connected with the circle $a^5$ and with the upper portion of the standard $a^3$ and affording a bearing for the vertical shaft $F^3$.

The axle B is firmly connected with the main frame in a suitable manner. The wheels $B^1$ are equipped with sprocket wheels which are connected by the sprocket chains $E^3$ with the shaft E.

The front wheel-frame or turn-table C comprises a lower circle $c$ on which the circle $a^4$ is anti-frictionally supported, as shown in Fig. 6; a standard $c^1$ rising therefrom and supported on bars $c^2$ which are connected with the circle $c$, in the manner shown in Fig. 7; and a circle or head $c^3$ surmounting the standard $c^1$ and upon which is anti-frictionally supported the circle $a^5$ of the main frame. The large bevel gear $G^7$ constituting a portion of the steering mechanism is firmly secured to the standard $c^1$.

The motor D may be of any approved type. Its shaft rotates in one direction and the counter-shaft $D^2$ rotates in the opposite direction. The shaft E has journaled thereon sprocket wheels $e$, $e^1$ with which the sprocket chains $E^1$, $E^2$, respectively, are connected. The shaft E is further equipped with clutch members $e^2$, $e^3$ which are splined on the shaft and equipped with operating levers $e^4$. It will be understood that the shaft E may be rotated in either direction at will, according to the clutch which is employed to transmit power to the shaft. Accordingly, the rear wheels $B^1$ may be driven in either direction.

The shaft F is equipped with sprocket wheels $f^1$ with which the sprocket chains $F^2$, $F^1$, respectively, are connected. The shaft F is further equipped with clutch members $f^2$, $f^3$ operated by levers $f^4$, so that the shaft F may be rotated in either direction, according to the clutch employed. Motion is transmitted from the shaft F to the vertical shaft $F^3$ by means of a pair of bevel gears $f^5$; and motion is transmitted from the vertical shaft $F^3$ to the longitudinal shaft $F^4$ by means of a pair of bevel gears $f^6$. Motion is transmitted from the horizontal shaft $F^4$ to the vertical shaft $F^5$ by means of a pair of bevel gears $f^7$. Motion is transmitted from the vertical shaft $F^5$ to the horizontal shaft $F^6$ carried by the front wheel or turn-table by means of a pair of bevel gears $f^8$.

The shaft G has journaled thereon sprocket wheels $g$, $g^1$ with which the sprocket chains $G^1$, $G^2$ are respectively connected. Said shaft G is further equipped with clutch members $g^2$, $g^3$ which are splined thereon, the former being equipped with a hand-wheel $g^4$ and the latter with a lever $g^5$. It will be understood that the shaft G may be rotated in either direction, therefore, according to the clutch member employed; or, if desired, the hand-wheel $g^4$ may be employed to turn the shaft G for steering purposes.

The shaft H has journaled thereon sprocket wheels $h$, $h^1$ between which is locked a double clutch member $h^2$ operated by a lever $h^3$. The clutch member $h^2$ is splined on the shaft H and by its means either one of the sprocket wheels $h$, $h^1$ may be connected to operate the shaft H. Accordingly, the shaft H may be rotated in either direction, according to the clutch member employed.

From the foregoing detailed description, the operation will be readily understood. The engine-shaft $D^1$ rotates in one direction and the counter-shaft $D^2$ rotates in the opposite direction. The shafts E, F and G are connected with both the engine-shaft and the counter-shaft, so that they may be operated in either direction at will. The gearing between the front wheels and the engine and the rear wheels and the engine is such that the wheels tend to travel over the ground at the same speed. The machine may be steered by power, by connecting either the clutch $g^2$ or the clutch $g^3$, according to the direction in which it is desired to turn the machine. If desired, however, the worm-shaft G may be operated by the hand-wheel $g^4$, as where it is desired to make a slight turn when the machine is traveling over ground of a character to render the machine readily dirigible. It will be observed that the worm-gear employed in the steering mechanism serves to lock the turn-table in any desired position when the shaft G is stationary.

Modifications of the invention herein disclosed are illustrated in my application No. 316,310 filed May 11, 1906, and my application No. 316,311 filed May 11, 1906.

The foregoing detailed description has been given for clearness of understanding only and no undue limitation is to be understood therefrom.

What I claim as new and desire to secure by Letters Patent is:

1. The combination of a front wheel, a front wheel-frame supported thereon, a main frame having its front end swiveled on said wheel-frame, wheels supporting the rear end of the main frame, a motor mounted on the main frame and having a shaft rotating in one direction, a counter-shaft journaled on the main frame and geared to the motor shaft and rotating in an opposite direction, and a vertical shaft coaxial with the axis of said wheel-frame and geared to said motor shaft and to said counter-shaft.

2. The combination of a front wheel, a front wheel-frame supported thereon, a main frame having its front end swiveled on said wheel-frame, wheels supporting the rear end of the main frame, a motor mounted on the main frame and having a shaft rotating in one direction, a counter-shaft geared to the motor-shaft and rotating in the opposite direction, and steering mechanism mounted on the main frame and geared to said wheel-frame and also geared to the motor-shaft and the counter-shaft.

3. The combination of a front wheel, a front wheel-frame supported thereon, a main frame having its front end swiveled on said wheel-frame, wheels supporting the rear end of the main frame, a motor mounted on the main frame, a vertical shaft coaxial with the axis of said wheel-frame and geared to said front wheel, a counter-shaft geared to the motor-shaft and rotating in an opposite direction, a transverse shaft journaled on the main frame and geared to said vertical shaft and geared also to the motor-shaft and said counter-shaft, and steering mechanism mounted on the main frame and geared to said wheel-frame.

4. The combination of a front wheel, a front wheel-frame supported thereon, a main frame having its front end swiveled on said wheel-frame, wheels supporting the rear end of the main frame, a motor mounted on said main frame and having a shaft rotating in one direction, a counter-shaft geared to the motor-shaft and rotating in the opposite direction, a shaft parallel with the counter-shaft and geared to the engine-shaft and to the counter-shaft and geared also to the rear wheels, a shaft journaled on the main frame and geared to the motor-shaft and the counter-shaft, a longitudinally-disposed shaft geared to said last-named shaft and a vertically-disposed shaft coaxial with the wheel-frame and geared to said longitudinally-disposed shaft and to said front wheel.

5. In a machine of the character described, the combination of a main frame equipped at its front end with an upper circle and a lower circle, a wheel-frame equipped with an upper circle and a lower circle, upon which said first-named circles are journaled, front wheels supporting said wheel-frame, rear wheels supporting the rear portion of the main frame, a vertical shaft coaxial with the wheel-frame and geared to the front wheels, a longitudinally-disposed shaft journaled on the main frame and geared to said vertical shaft, a vertical shaft in the rear of said first-named vertical shaft and geared to said longitudinal shaft, a transverse shaft geared to said last-named vertical shaft, a bevel gear secured to the front wheel-frame, a longitudinally-disposed shaft equipped with a bevel gear meshing with said first-named bevel gear, a transverse worm-shaft geared to said last-named longitudinal shaft, and a motor mounted on the main frame and geared to said transverse shafts.

THOMAS J. THORP.

In presence of—
  A. U. Thorien,
  J. H. Landes.